United States Patent [19]

Arditty et al.

[11] Patent Number: 4,770,047
[45] Date of Patent: Sep. 13, 1988

[54] OPTICAL FIBER SENSOR

[75] Inventors: Hervé Arditty, Marly le Roi; François-Xavier Desforges, Versailles; Luc Jeunhomme, Fontenay le Fleury, all of France

[73] Assignee: Photonetics, Marly le Roi, France

[21] Appl. No.: 39,084

[22] Filed: Apr. 16, 1987

[30] Foreign Application Priority Data

Apr. 24, 1986 [FR] France .............................. 86 05948

[51] Int. Cl.$^4$ ............................................... G01L 1/24
[52] U.S. Cl. ................................ 73/800; 250/231 R; 250/357.1
[58] Field of Search ............. 250/357.1, 231 R, 231 P; 350/96.29, 96.15; 73/800, 290 R, 705

[56] References Cited

U.S. PATENT DOCUMENTS

| 4,421,979 | 12/1983 | Asawa et al. | 350/96.15 |
| 4,629,316 | 12/1986 | Shen et al. | 356/73.1 |
| 4,633,079 | 12/1986 | Rieger | 350/96.29 |
| 4,664,732 | 5/1987 | Campbell et al. | 350/96.15 |

Primary Examiner—Stewart J. Levy
Assistant Examiner—Robert R. Raevis
Attorney, Agent, or Firm—Felfe & Lynch

[57] ABSTRACT

In an optical fiber sensor, the fiber has a sensitive zone which cooperates with a retroreflecting surface through the agency of an optical couplant. The function of the retroreflecting surface is to return into the optical fiber all light losses which escape from the fiber in the sensitive zone.

11 Claims, 2 Drawing Sheets

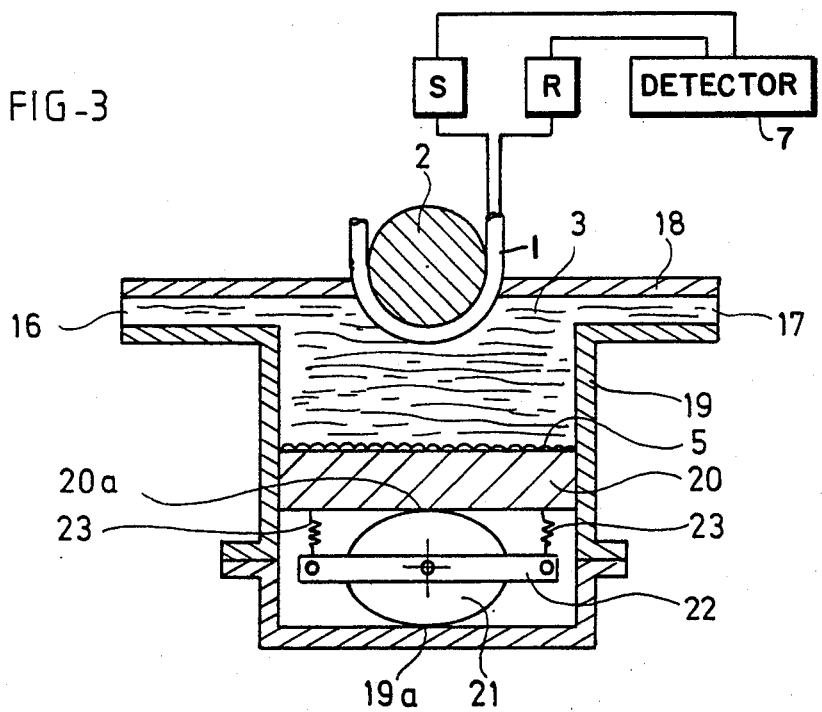
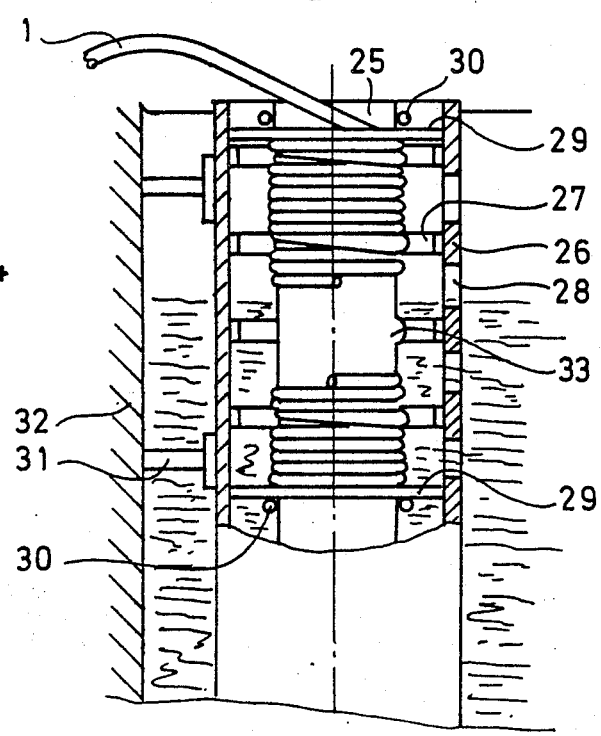

OPTICAL FIBER SENSOR

BACKGROUND OF THE INVENTION

1. Field of the Invention

The present invention relates to an optical fiber sensor and to a detection device provided with at least one sensor of this type.

It is known that optical fibers offer outstanding advantages in the transmission of data by light waves by means of a wide range of different sensors. The invention is concerned with the particular case in which the sensor is constituted at least partially by a sensitive zone of the fiber itself. A number of sensors of this type can be placed in series along the fiber and serve to collect information by means of their sensitive zones which usually consist of curved portions (bends) of the fiber.

2. Description of the Prior Art

Optical fibers are already in common use in measuring techniques. In particular, European patent No. EP-A-0 000 319 filed in the name of Battelle Memorial Institute presented a device based on optical fiber technology for use as a refractometer or level indicator. In this device, a light beam is injected in a predetermined direction into one end of the optical fiber in order to permit reflections of the light rays along the fiber, said optical fiber being immersed in a liquid having a refractive index which is different from that of the fiber. When the light rays which undergo these different reflections exceed a limit angle with respect to the surrounding medium, the light rays which have a smaller angle of incidence are refracted outside the fiber. When a curved surface is encountered along the fiber, the reduction in the angle of incidence of the light rays which impinge upon the surface produces an increase in the limit angle of the light beams with respect to the refractive index liquid, thereby causing the incident light rays which exceed the limit angle to pass by refraction within said liquid. By means of a combination of alternate curves or so-called bends arranged in succession in opposite directions, it is possible to obtain a light signal which has particularly high sensitivity and performs a function of amplification of the effects obtained at the time of passing through the first bend. This device permits applications in particular in the measurement of a level of liquid but requires an optical installation at each end of the fiber. It is also a common practice in techniques of measurement by electric fibers to subject the fiber to modifications of shape in order to permit measurement of certain parameters. Thus U.S. Pat. No. US-A-4,436,995 filed in the name of General Electric Company presents optical fiber sensors for measuring the amplitude of certain parameters such as mechanical displacements, pressure, temperature, current or voltage. To this end, a portion of the fiber corresponding to a sensitive zone is subjected to variations of bend curvature representing the change in the parameter to be measured. The losses resulting from microbends in the fiber represent an attenuation of the light energy between a light-emitting source and a light-arrival detector. In this device, the fiber is subjected to variations in bend curvatures by application of two teeth placed on each side of the fiber so that the throat of one tooth cooperates symmetrically with the crest of the opposite tooth, the bend curvature of the fiber being varied by clamping between said opposite teeth. As a result of this variation, detection of parameters can be obtained when light energy is injected into one end of the fiber and when the beam is scanned at the other end.

More specifically, the present invention relates to devices of this type in which the light signals are emitted at one end of the fiber and in which the device for receiving information is also placed at the same end.

The phenomena utilized in these devices no longer involve direct transmission of light from one end of the fiber to the other but the received items of information are contained in a so-called backscattered signal which propagates in the direction opposite to the emission light pulse. The light pulse emitted at one end of the fiber experiences losses during travel since part of the light is scattered and escapes from the fiber. The return signal received at the emission end therefore undergoes attenuation which increases with the distance traveled within the fiber. The phenomena detected by the sensitive zones of the fiber are represented by variations in attenuation of said back-scattered signal. It is apparent that these variations in attenuation considered alone are very small since they apply only to a minor proportion of the total light.

The aim of the present invention is to retain all the advantages of sensors employed heretofore by utilizing the variation in attenuation of the back-scattered signal received by a device placed at the same end of the fiber as an emission device while nevertheless permitting a signal of much higher strength.

The basic concept lies in the fact that the sensitive zone is placed in a coupling medium or so-called couplant, that the lost light which escapes from said sensitive zone through means such as a bend or in any other manner will propagate in said couplant and that a retroreflecting surface is employed for recoupling the losses within the fiber.

SUMMARY OF THE INVENTION

Accordingly, it is an object of the invention to provide an optical fiber sensor in which the optical fiber essentially has a sensitive zone adapted to co-operate with a retroreflecting surface through the agency of an optical couplant, the intended function of said retroreflecting surface being to return into the optical fiber light losses which escape from said fiber in said sensitive zone.

Thus the light signals which propagate within the fiber when they arrive in the sensitive zone of the fiber are ejected from the fiber in the case of a small number of signals and propagate in the couplant until they strike the retroreflecting surface which returns the light-ray losses in their directions of incidence for reinjection into the fiber near the signal emission end.

In accordance with a secondary feature of the invention, the sensor is provided with a loss-inducing bend in the sensitive zone of the optical fiber.

In accordance with another secondary feature of the invention, the retroreflecting surface of the sensor is given an angular orientation with respect to an axis of symmetry of the bend which is determined experimentally in such a manner as to return into the optical fiber a maximum quantity of light losses which escape from the sensitive zone of said fiber as a result of the bend.

In accordance with a further distinctive feature of the sensor, the fiber is provided in its sensitive zone with a plurality of successive microbends adapted to cooperate with one and the same retroreflecting surface.

The invention also applies to a detection device comprising at least one sensor as described in the foregoing and, at one end of the optical fiber which is provided with said sensitive zone, a light-signal emission source and a system for receiving echo light signals resulting from retroreflection of said losses.

In accordance with a secondary feature of the detection device, provision is made for a plurality of sensitive zones located at intervals along the length of one and the same optical fiber.

Three distinctive features of the sensor can have an influence on the response of emitted signals: the sensitive zone of the optical fiber, the distance from the retroreflecting surface to the sensitive zone of the fiber, the presence, the absence or the variations in properties of the couplant.

In a particular embodiment of the detection device, the sensitive zone has a plurality of successive microbends formed between two plates which are subjected to a pressure constituting a quantity to be detected, each plate being adapted to carry a retroreflecting surface located opposite to the optical fiber and the internal space between the two plates being filled with couplant.

In a second particular embodiment of the detection device, the distance within the sensor between the sensitive fiber zone from which the light losses escape and the retroreflecting surface is variable as a function of a quantity to be detected.

Finally, in a third particular embodiment of the detection device, the sensitive zone of said fiber is placed within a couplant, the properties of which and the presence or absence of which represent the variations in a quantity to be detected.

BRIEF DESCRIPTION OF THE DRAWINGS

FIG. 3 illustrates an application in the case of variation in distance between the optical fiber and the retroreflecting surface.

FIG. 4 relates to a level measurement application.

DESCRIPTION OF THE PREFERRED EMBODIMENTS

Figure 1:
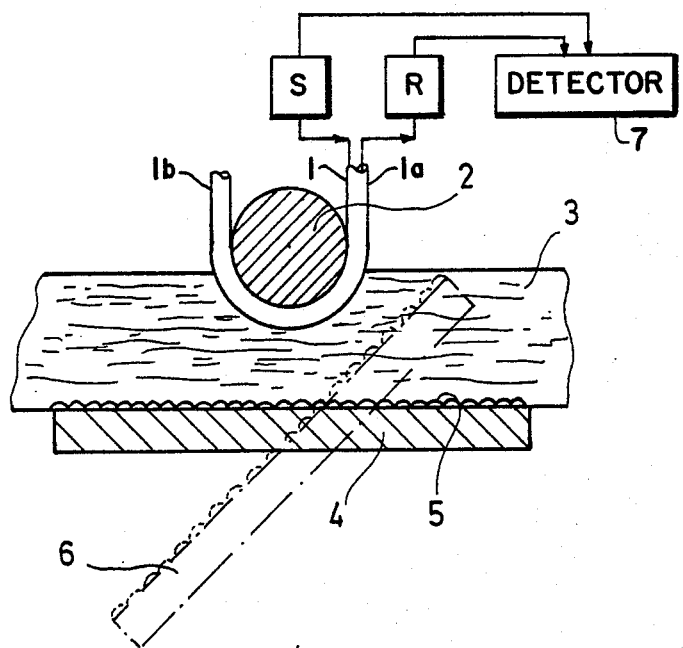
FIG. 1 is a schematic illustration of the sensitive zone of the optical fiber.

In a particular embodiment of a device in accordance with the invention, FIG. 1 shows a portion of optical fiber provided with a sensitive zone which will permit the use of a source S for the emission of light signals, a system R for receiving echo light signals at the same end of the fiber and an electronic detector 7 electrically connected to the source S and receiving system R. The optical fiber 1 is bent locally by a mechanical deformer which includes a cylindrical rod 2. The fiber then has at this point a radius of curvature which is of greater or lesser value according to the contact existing between the optical fiber 1 and the rod 2. The zone of curvature, or bend zone, is immersed in an optical couplant such as a liquid having a refractive index close in value to the refractive index of the fiber jacket which permits propagation of light losses from the interior of the fiber to the couplant. A retroreflecting surface 5 is placed in contact with said couplant liquid and fixed on a support 4. In a manner known per se, said retroreflecting surface 5 is composed of a succession of hemispherical reflectors of extremely small diameter which are bonded to each other and provide said surface with retroreflecting power or in other words the ability to reflect the light rays impinging thereon back in the direction of incidence of said light rays. This retroreflecting surface 5 is placed in close proximity to the sensitive zone formed by the bent portion of the fiber and is contained in the couplant.

An optical fiber transmits light signals along a rectilinear path by successive total reflections of said signals from its external surface. However, it is known that, when the optical fiber is no longer rectilinear and is bent to a greater or lesser extent, the light signals which propagate within said fiber are no longer totally reflected but pass out of the fiber. The aim of the invention is therefore to make use of these losses by endeavoring to send them back in the direction opposite to the transmission with a view to utilizing them in the fiber-bend zones for the purpose of deducing therefrom values of attenuation of the electric signals related to the echo light signals. This measurement will be performed on the amplitude of the echo reflected from the retroreflecting surface.

In the device shown in FIG. 1, light signals are applied to the fiber end 1a the optical fiber 1 and are reflected along this fiber. When they arrive at the fiber bend formed by the cylindrical rod 2, a certain number of these signals escape from the fiber in a given direction and penetrate into the coupling medium or so-called couplant 3. These light signals propagate within said couplant until they strike the retroreflecting surface 5. After reflection from this surface 5, said signals travel back along the same path but in the opposite direction in order to re-enter the fiber 1 and return to the signal emission end 1a. The position of the retroreflecting surface with respect to the radius of curvature of the fiber is lobated between two extreme positions. Losses of light rays at the level of the bend do not take place along the tangents to each point of the bend but along a cone, the axis of which is located in the direction of the emission. In order to collect a maximum quantity of losses on the retroreflecting surface, it is therefore useful to orient this surface in a tilted position with respect to the fiber light signal emission. This position can vary between the angular positions represented in FIG. 1 by the supports 4 and 6, the optimum loss collection position being that of the support 6.

A receiving system R will be placed at the end 1a the fiber in order to record the echo of the emitted signals when a number of these latter will be dispersed in the couplant and will again have been focused towards the emission end. The fact that signals lost in the couplant liquid are returned by the retroreflecting surface constitutes a considerable improvement over existing systems since it permits more effective utilization of the light lost at the fiber bend whereas this light had been permanently lost up to the present time. This device also permits considerably enhanced performances. It is thus possible to obtain loss detection coefficients having a sensitivity of ten to one hundred times higher than systems in existence up to the present time. This sensitive zone of the optical fiber makes it possible to collect results from signals emitted at one fiber end and to analyze the echo which returns to the same end. Furthermore, since the measurement is performed on the amplitude of the light-signal echo, the maximum number of sensors which operate on this principle and can be interrogated by a system of this type is independent of the pulse time duration, which is a further improvement over existing systems.

Figure 2:
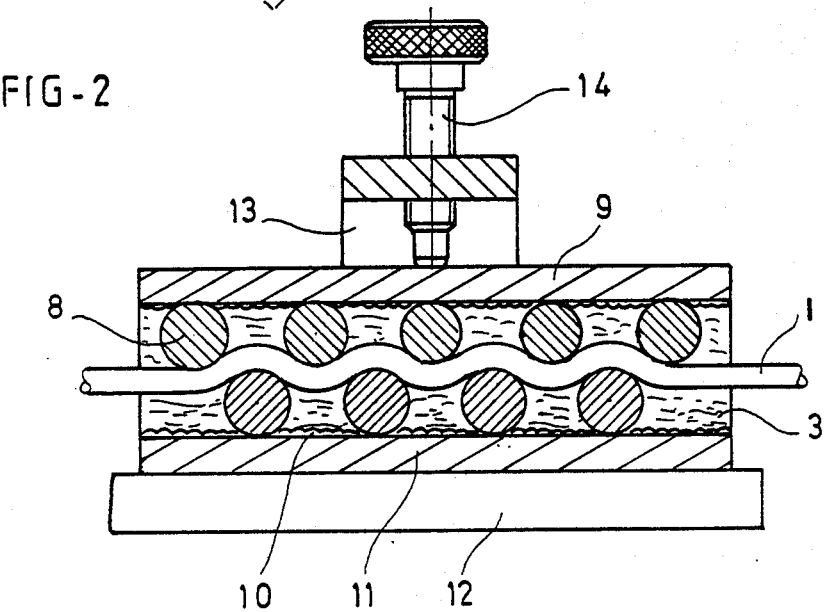
FIG. 2 illustrates an application in the case of variation of microbends.

FIG. 2 illustrates a device in which a variation is produced in a sensitive zone consisting of a plurality of successive fiber bends known as microbends. This device is particularly applicable to detection of a pressure exerted on said sensitive zone of the fiber. The device is composed of a vise having two clamping plates 9 and 11. Cylindrical rods are placed on each plate 9 and 11 at uniform intervals, the cylindrical rods of the plate 9 being placed in staggered relation to the cylindrical rods of the plate 11. The optical fiber is placed between the two series of cylindrical rods 8 and 9. The internal space between the two plates 9 and 11 is filled with refractive-index liquid 3 and the entire surface of the two plates is covered with material having retroreflecting properties as described earlier. The vise rests on a support 12 and has a projecting top portion 13 traversed by a screw 14 which is applied against the external portion of the vise plate 9. When the screw 14 is tightened, the two plates 9 and 11 move towards each other. The optical fiber 1 is in contact with both series of cylindrical rods. The closing movement of the vise plates therefore entails a reduction in radius of all the microbends. In this device, the recoupling coefficient remains constant and the same applies to the presence of the recoupling medium throughout the internal space located between the two plates 9 and 11. The only variations which occur are those of the microbends placed along the fiber within the device. It is thus possible to measure losses arising from the bends along the fiber while having access to this latter solely at one end, the quality of measurement thus achievable being considerably greater than in prior art systems which involved attenuations of the first component of the return signal.

The device in accordance with the invention therefore offers the advantage of practical realization by means of simple equipment and by means of a sensitive zone as described in the foregoing. By way of example, one particular application could consist of a passage detector. Thus a device as described earlier is placed beneath the rails of a railroad track. Since the passage of a train produces a pressure force on the rails, the top plate of the device will move towards the bottom plate, thus producing a variation of the microbends.

Another potential application of this optical fiber sensor consists in utilizing the distance between the bend and the retroreflecting surface. FIG. 3 illustrates this application. An optical fiber 1 is bent by means of a cylindrical rod 2 and placed within a vessel limited by walls 18, 19 and filled with a refractive index liquid 3. This vessel is provided with two orifices 16, 17 for admission or discharge of the liquid into or from the system without varying its index of refraction. The lower portion of the vessel can be fitted with a movable object 20. When this movable object 20 undergoes a displacement, the distance between the retroreflecting surface and the fiber bend varies. One specific application for which the device may advantageously be employed is a contactor in an open position and in a closed position. The variations in state produce a displacement of the retroreflecting surface support and the optical fiber accordingly detects this displacement by means of a response which is different from the light signals applied thereto.

Another potential application to detection of continuous position variations can be realized by a valve, the extent of opening of which is made to vary by the rotation of a cam 21. When said valve is progressively opened, the component 21 which has an ovoid cross-section is driven in rotation and always remains in contact with the bottom end-wall 19A of the vessel while being applied at 20A in contact with the support 20 of the retroreflecting surface. Since said component 21 has a progressive profile, the distance between the retroreflecting surface and the fiber bend therefore varies progressively and the detection of a return trip of a signal applied to one end can therefore take this displacement into account. In order to ensure correct return of the support 20, springs 23 attached to said support 20 are connected to a horizontal bar 22. Thus, when the distance between retroreflecting surface and fiber bends decreases, the springs will expand. The component 21 will then return to an initial position and the resilient force of said springs will bring the support 20 back to its initial position.

The third application relates to variations in properties of the couplant between the optical fiber and the retroreflecting material. The variations in optical properties of the couplant such as temperature, for example, are already known. Devices of the prior art, however, utilized the incidence on the transmission of light pulses between the two fiber ends whereas this makes it possible in the present invention to obtain the same information by means of reflection phenomena with a fiber which provides access only at one end. The light-reflection refractive-index liquid is particularly advantageous when used for non-transient or continuous detection. This is the case when measuring levels of liquid such as liquid contained in reservoirs or storage tanks, for example. In applications of this type, the optical fiber 1 is coiled around a rod 25. One end of the fiber is connected to the signal emission source and to an echo detection system whilst the other end of the fiber is free and coiled down to the lower end of the rod 25. Bosses 33 are located in spaced relation and at precise distances along the entire length of the rod, the optical fibers being applied against said bosses. Constant losses by bending are prevented by winding around a central rod having a sufficiently large diameter. The presence of bosses along said rod makes it possible to produce forcible bending of the optical fiber at a location which accordingly constitutes a sensitive zone. Said rod 25 is placed in a tube 26 and held in position within said tube by means of grids 29, 30 which serve to center the rod 25 in the axis of the tube 26. Narrow strips 27 of retroreflecting material are placed on the entire internal circumference of the tube 26 and located in spaced relation along the entire length of said tube at uniform intervals corresponding to the distance between the bosses 33 of the rod.

Finally, orifices 28 for the admission of liquid are provided in the tube 26. In a reservoir in which the level of liquid varies, it will be possible to perform a correct calibration of responses of the fiber to a variation in level in order to determine the particular retroreflecting strip which is the last to have been in contact with the liquid. This simple device has the advantage of being independent of the reservoir and can readily be placed in any type of reservoir or storage tank. Said device is in contact with the reservoir by means of fastening rods 31 or any other means for supporting this system on a reservoir surface.

The present invention is clearly not limited in any sense to the particular features which have been specified in the foregoing or to the details of the particular embodiment which has been chosen by way of example solely in order to provide an explanatory illustration of the invention. All types of alternative arrangements can be made in the constructional design hereinabove described by way of example and in its constituent elements without thereby departing either from the scope or the spirit of this invention. The broad purview of the invention includes all means which are technically equivalent to those described as well as combinations of such means.

What is claimed is:

1. In an optical fiber sensor comprising an optical fiber for transmitting light from an emission source to a sensitive zone of said fiber and means for receiving echo light signals from said sensitive zone, the improvement wherein said sensitive zone comprises at least one loss-inducing fiber bend, and wherein said sensor further comprises a retroreflecting surface in optical coupling relationship with said fiber bend for returning, back into said light signals, light losses escaping from said fiber in said sensitive zone.

2. The optical fiber sensor defined in claim 1, wherein said retroreflecting surface is angularly oriented in a tilted position with respect to an axis of symmetry of said bend.

3. The optical fiber sensor defined in claim 1, further comprising means for bending said optical fiber in said sensitive zone in dependence upon a property to be detected.

4. The optical fiber sensor defined in claim 1, wherein said sensitive zone comprises a plurality of successive fiber bends in optical coupling relationship with said retroreflecting surface.

5. The optical fiber sensor defined in claim 1, comprising a plurality of sensitive zones with a respective, associated retroreflecting surface optically coupled with each sensitive zone, said sensitive zones being located at intervals along said optical fiber.

6. The optical fiber sensor defined in claim 5, comprising means to vary light losses at each of said sensitive zones towards each respectively associated retroreflecting surface as a function of variations in a property to be detected.

7. The optical fiber sensor defined in claim 5, wherein said plurality of successive fiber bends are microbends and said sensor comprises two plates, each on one side of said sensitive zones, said plates being subjected to a pressure consitituting a property to be detected, each plate carryng a retroreflecting surface in optical coupling relationship with said fiber in said sensitive zone, whereby said retroreflecting surface is at a distance from said micro-bends which varies as a function of said pressure.

8. The optical fiber sensor defined in claim 5, wherein said fiber is curled around a central rod provided with bosses which form in said fiber each of said successive sensitive zones and said retroreflecting surfaces are provided at regular intervals along a tube surrounding said central rod and wherein said sensor is at least partly immersed in a liquid couplant, said sensor being thereby sensitive to variations in level of said couplant between said central rod and said tube.

9. The optical sensor defined in claim 1, wherein said retroreflecting surface is supported by a movable member and said sensor comprises a means for moving said movable member in dependence upon a property to be detected, thereby producing variations in distance between said bend and said retroreflecting surface.

10. An optical fiber sensor defined in claim 1, wherein said sensitive zone and said retroreflecting surface are in optical coupling connection through a liquid couplant which is varied in its optical properties, or in its presence or absence according to variations of a property to be detected.

11. The optical fiber sensor defined in claim 1, further including electronic means associated with said emission source and said receiving means at an emission end of said fiber for determining variations in an echo signal intensity depending on variations of a property to be detected having an influence on the amount of said light losses returned back in said fiber.

* * * * *